United States Patent
Marini et al.

(10) Patent No.: US 9,982,630 B2
(45) Date of Patent: May 29, 2018

(54) TURBOFAN BYPASS AIR COOLED OIL COOLER FAIRINGS

(71) Applicant: PRATT & WHITNEY CANADA CORP., Longueuil (CA)

(72) Inventors: Remo Marini, Lasalle (CA); Roberto Marrano, Boucherville (CA); Adam Trumpour, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 326 days.

(21) Appl. No.: 14/721,412

(22) Filed: May 26, 2015

(65) Prior Publication Data
US 2016/0348585 A1    Dec. 1, 2016

(51) Int. Cl.
*F02K 3/115*    (2006.01)
*F02K 3/105*    (2006.01)
(Continued)

(52) U.S. Cl.
CPC .............. *F02K 3/115* (2013.01); *B64D 33/08* (2013.01); *B64D 33/10* (2013.01); *F02C 7/12* (2013.01); *F02C 7/14* (2013.01); *F02C 7/141* (2013.01); *F02C 7/18* (2013.01); *F02C 7/185* (2013.01); *F02K 3/105* (2013.01); *B64D 2033/024* (2013.01); *B64D 2033/0286* (2013.01); *F02C 7/143* (2013.01); *F02C 7/32* (2013.01); *F02K 1/822* (2013.01); *F02K 3/00* (2013.01); *F02K 3/025* (2013.01); *F02K 3/04* (2013.01); *F02K 3/06* (2013.01); *F02K 3/062* (2013.01); *F02K 3/065* (2013.01); *F02K 3/068* (2013.01); *F02K 3/075* (2013.01); *F02K 3/077* (2013.01); *F05D 2250/13* (2013.01); *F05D 2250/50* (2013.01);
(Continued)

(58) Field of Classification Search
CPC .. B64D 33/08; B64D 33/10; B64D 2033/024; B64D 2033/0286; F02C 7/12; F02C 7/14; F02C 7/141; F02C 7/143; F02C 7/18; F02C 7/185; F02C 7/32; F02K 1/822; F02K 3/00–3/077; F02K 3/105; F02K 3/115; F05D 2250/13; F05D 2250/50; F05D 2250/51; F05D 2250/52; F05D 2250/712; F05D 2260/20; F05D 2260/213; F28D 2021/0021; F28D 2021/0026; F28D 2021/0049
See application file for complete search history.

(56) References Cited

U.S. PATENT DOCUMENTS 6,058,696 A    5/2000   Nikkanen et al.
6,106,229 A    8/2000   Nikkanen et al.
(Continued)

*Primary Examiner* — Gerald L Sung
*Assistant Examiner* — Scott Walthour
(74) *Attorney, Agent, or Firm* — Norton Rose Fulbright Canada LLP

(57) ABSTRACT

A cooler assembly disposed in and cooled by an air stream according to one embodiment includes a cooler matrix and a fairing. The fairing assembly is disposed generally around the cooler matrix and includes side fairing-housings, first and second side fairing-housings being joined to one another at respective leading and trailing edges, the leading edges partially defining a cooler inlet and the trailing edges partially defining a cooler outlet, the first and second side fairing-housing trailing edges angled transversely toward each other to define a trapezoidal shape for the outlet.

13 Claims, 7 Drawing Sheets

(51) Int. Cl.
  B64D 33/10    (2006.01)
  F02C 7/12     (2006.01)
  F02C 7/141    (2006.01)
  B64D 33/08    (2006.01)
  F02C 7/18     (2006.01)
  F02C 7/14     (2006.01)
  *F02K 3/075*      (2006.01)
  *F02K 3/06*       (2006.01)
  *B64D 33/02*      (2006.01)
  *F02K 3/068*      (2006.01)
  *F28D 21/00*      (2006.01)
  *F02C 7/32*       (2006.01)
  *F02K 3/077*      (2006.01)
  *F02K 3/02*       (2006.01)
  *F02K 3/04*       (2006.01)
  *F02K 3/00*       (2006.01)
  *F02K 1/82*       (2006.01)
  *F02K 3/065*      (2006.01)
  *F02C 7/143*      (2006.01)
  *F02K 3/062*      (2006.01)

(52) U.S. Cl.
  CPC ...... *F05D 2250/51* (2013.01); *F05D 2250/52* (2013.01); *F05D 2250/712* (2013.01); *F05D 2260/20* (2013.01); *F05D 2260/213* (2013.01); *F28D 2021/0021* (2013.01); *F28D 2021/0026* (2013.01); *F28D 2021/0049* (2013.01); *Y02T 50/671* (2013.01); *Y02T 50/675* (2013.01)

(56) References Cited

U.S. PATENT DOCUMENTS

| | | |
|---|---|---|
| 7,377,100 B2 | 5/2008 | Bruno et al. |
| 7,861,512 B2 | 1/2011 | Olver et al. |
| 7,862,293 B2 | 1/2011 | Olver |
| 7,886,520 B2 | 2/2011 | Stretton et al. |
| 8,387,362 B2 | 3/2013 | Storage et al. |
| 8,438,835 B2 | 5/2013 | Perveiler et al. |
| 8,516,791 B2 | 8/2013 | Perveiler et al. |
| 8,967,958 B2 | 3/2015 | Bajusz et al. |
| 9,091,229 B2 | 7/2015 | Pesyna et al. |
| 2007/0193725 A1* | 8/2007 | Coy .................. F28B 1/06 165/124 |
| 2009/0031695 A1* | 2/2009 | Perveiler ............ F02C 7/14 60/39.5 |
| 2010/0043386 A1* | 2/2010 | Perveiler ............ F02C 7/14 60/39.5 |
| 2013/0291554 A1 | 11/2013 | Marini et al. |
| 2016/0108814 A1 | 4/2016 | Schmitz |
| 2016/0348585 A1 | 12/2016 | Marini et al. |

\* cited by examiner

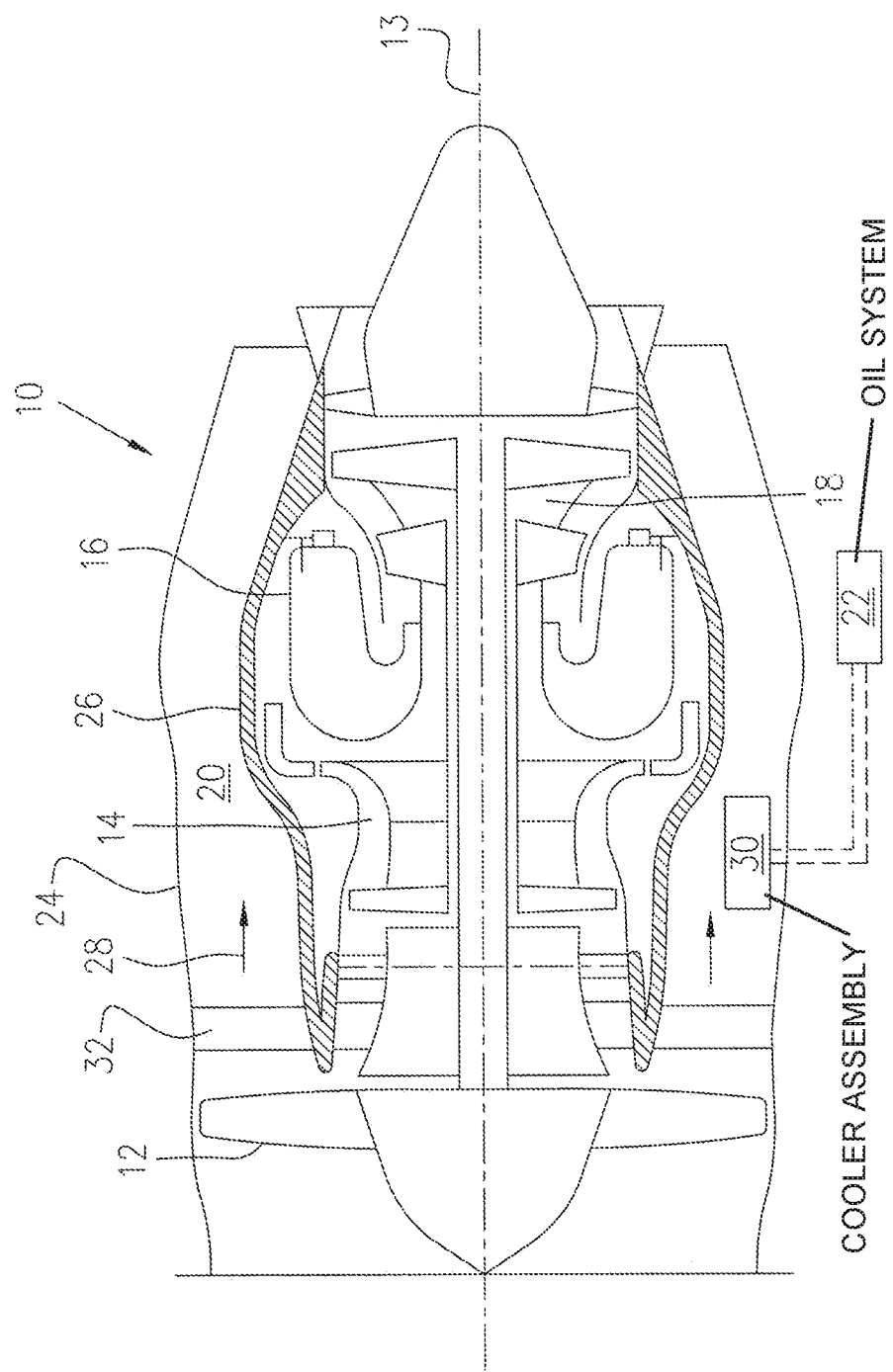

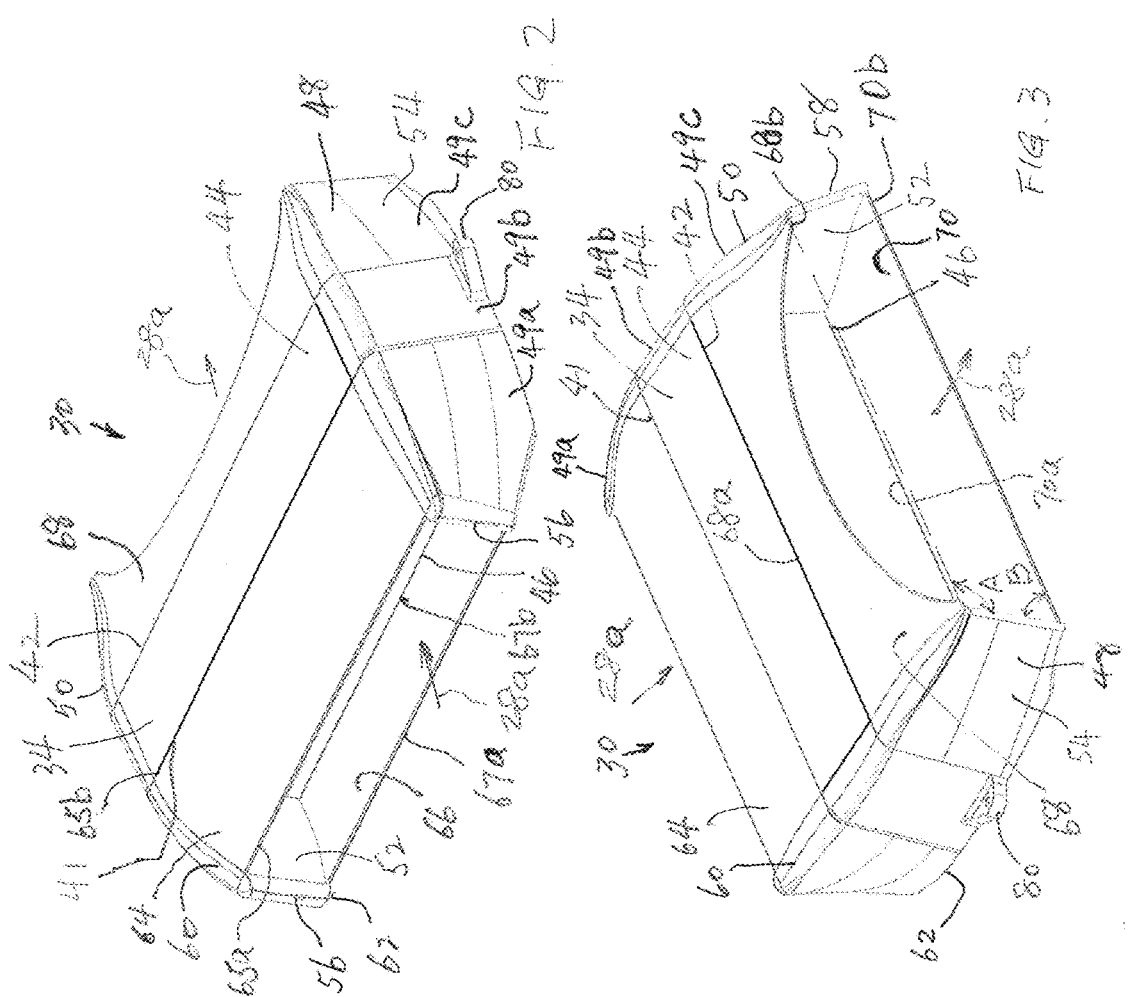

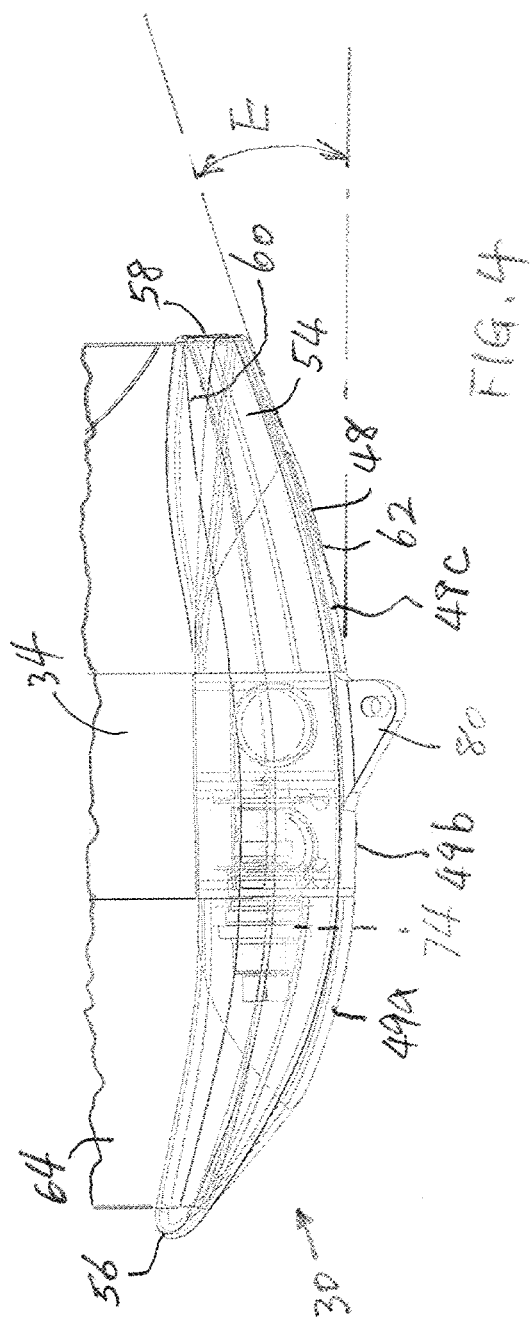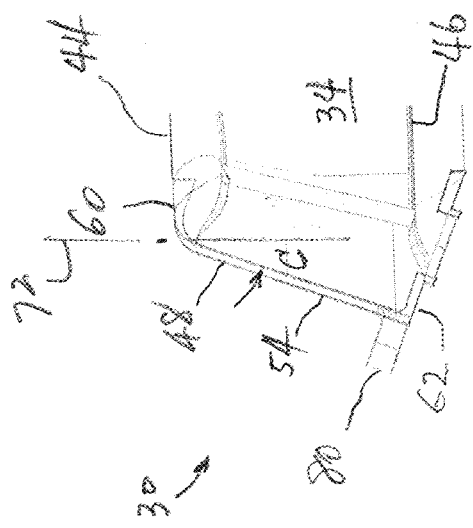

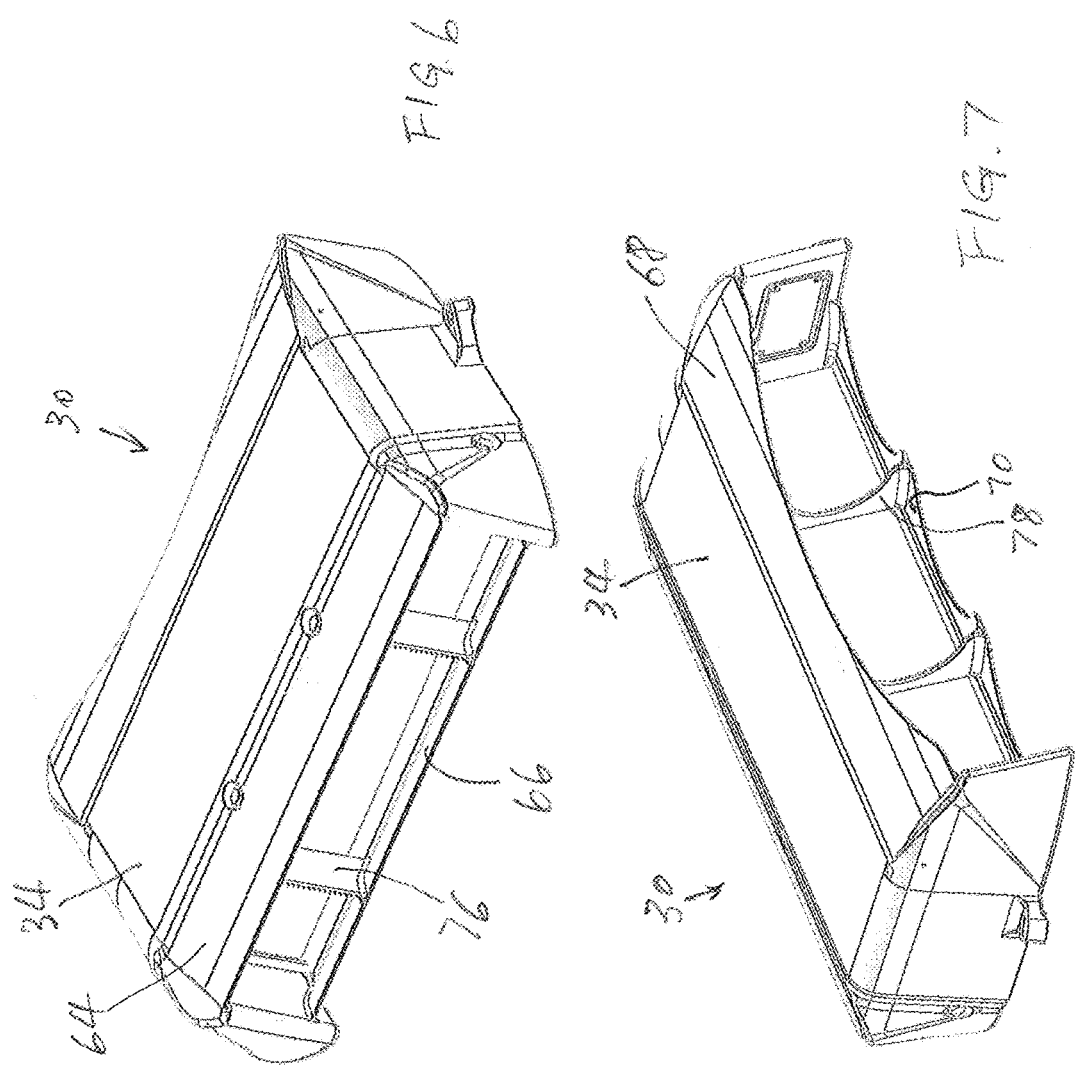

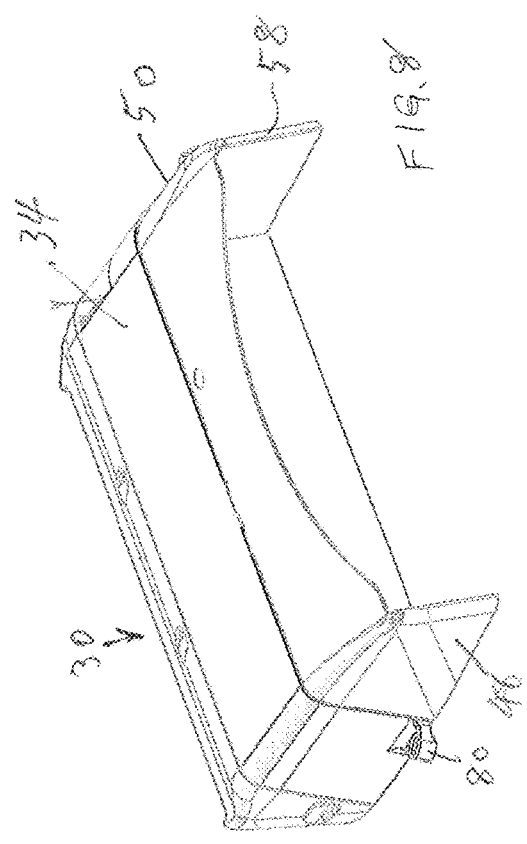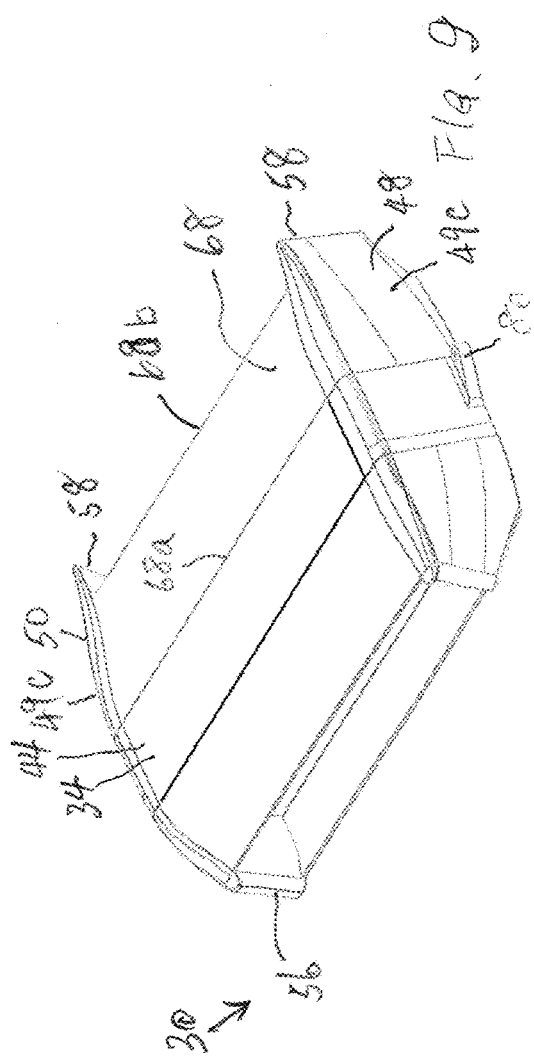

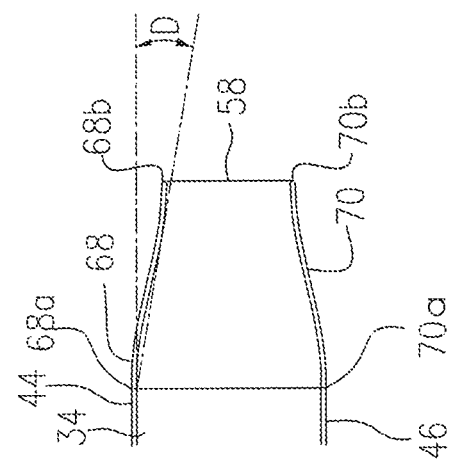
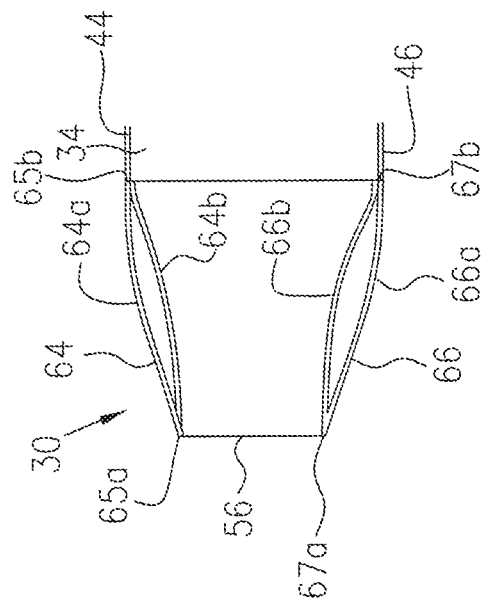

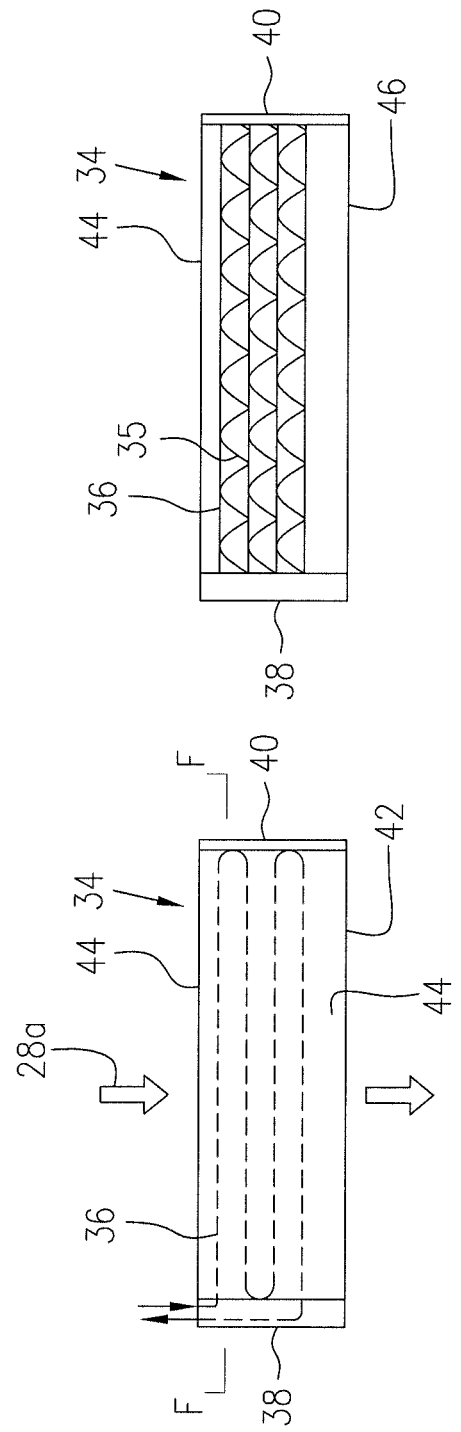

TURBOFAN BYPASS AIR COOLED OIL COOLER FAIRINGS

TECHNICAL FIELD

The application relates generally to gas turbine engines, and more particularly, to an air cooled cooler assembly in gas turbine engines.

BACKGROUND OF THE ART

Aircraft gas turbofan engines operate at high temperatures and therefore, engine components such as gear boxes and bearing cavities require efficient lubricating and cooling, for example by oil circulated in an oil system of the engine. The oil however, must be cooled for circulation and re-use in the oil system. Conventionally, an air cooled oil cooler used for such a purpose may be installed in the fan bypass air stream in turbofan engines. In some conventional air cooled oil cooler installations using a bypass cooling flow, the air cooled oil cooler may be partially submerged within or outside the bypass duct annulus with ducting to guide the desired flow. Installing air cooled oil coolers inside the fan bypass duct annulus of a turbofan engine requires meeting and balancing several design objectives from aerodynamics perspectives involving multi-disciplinary integration. Compact matrix coolers entirely disposed in a bypass air duct annulus may cause flow resistance to the bypass airstream and other issues affecting engine performance.

Accordingly, there is a need to provide an improved matrix-type oil cooler assembly for turbofan gas turbine engines.

SUMMARY

In one aspect, there is provided a cooler assembly disposed in and cooled by a cooling air stream, comprising: a cooler matrix in fluid communication with a fluid system, first and second side fairing-housings each having an inner skin and an outer skin joined at a leading edge and at a trailing edge of the first and second side fairing-housings, respectively, each of the first and second side fairing-housings forming an airfoil-like hollow configuration, the airfoil-like hollow configurations each having opposed first and second ends extending between the leading and trailing edges, each of the side fairing-housings defining a front, middle and rear portion from the leading edge to the trailing edge of the respective side fairing-housing, opposed sides of the cooler matrix being attached to and accommodated in the middle portion of the respective side fairing-housings, first and second front fairings spaced apart from each other extending in a downstream direction toward the cooler matrix and extending transversely between the front portions of the respective side fairing-housings to form an inlet for directing a portion of the cooling air stream to enter and pass through the cooler matrix, a first rear fairing positioned downstream of the cooler matrix and extending transversely between the rear portions of the respective side fairing-housings, the rear portions of the respective side fairing-housings and an inner surface of the first rear fairing directing the portion of the cooling air stream having passed through and having been discharged from the cooler matrix, the trailing edge of each side fairing-housing and the inner surface of the first rear fairing defining an obtuse angle therebetween.

In another aspect, there is provided a gas turbine engine having an annular duct defined radially between an outer duct wall and an inner duct wall for directing a fan driven bypass air stream passing therethrough, the gas turbine engine comprising: an oil cooler assembly disposed in the annular duct and attached to one of the outer and inner duct walls, the oil cooler assembly including a cooler matrix in fluid communication with an oil system of the engine, first and second side fairing-housings circumferentially spaced apart from each other, each side fairing-housing having an inner skin and an outer skin joined at a leading edge and at a trailing edge of the first and second side fairing-housings, respectively, and the first and second side fairing-housings each forming an airfoil-like hollow configuration, the airfoil-like hollow configurations each having radially opposed first and second ends extending axially between the leading and trailing edges, each of the side fairing-housings defining a front, middle and rear portion in an axial series from the leading edge to the trailing edge, transversely opposed sides of the cooler matrix being attached to and accommodated in the middle portion of the respective side fairing-housings, first and second front fairings radially spaced apart from each other extending in a downstream direction toward the cooler matrix and extending transversely between the front portions of the respective side fairing-housings to form an inlet for directing a portion of the bypass air stream to enter and pass through the cooler matrix, a first rear fairing positioned downstream of the cooler matrix and extending transversely between the rear portions of the respective side fairing-housings, the rear portions of the respective side fairing-housings and an inner surface of the first rear fairing directing the portion of the bypass air stream having passed through and having been discharged from the cooler matrix, wherein the second front fairing and the second ends of the respective airfoil-like hollow configurations are positioned radially adjacent said one of the outer and inner duct walls and the first front and first rear fairings and the first ends of the respective airfoil-like hollow configurations are positioned radially distal from said one of the outer and inner duct walls, and wherein the trailing edge of each side fairing-housing and the inner surface of the first rear fairing defining an obtuse angle therebetween.

DESCRIPTION OF THE DRAWINGS

Reference is now made to the accompanying figures in which:

FIG. 1 is a schematic side cross-sectional view of a gas turbine engine as an example illustrating application of the described subject matter;

FIG. 2 is a front top perspective view of an air cooled oil cooler assembly used in the engine of FIG. 1, according to one embodiment;

FIG. 3 is a rear top perspective view of the air cooled oil cooler assembly of FIG. 2;

FIG. 4 is a partial top plan view of the air cooled oil cooler assembly of FIG. 2, showing one of side fairing-housings of the cooler assembly accommodating a header side of a cooler matrix according to one embodiment;

FIG. 5 is a partial rear elevational view of the air cooled oil cooler assembly, showing a chamfered angle of the side fairing-housing of FIG. 4;

FIG. 6 is a front top perspective view of the air cooled oil cooler assembly according to another embodiment;

FIG. 7 is a top rear perspective view of the air cooled oil cooler assembly according to another embodiment;

FIG. 8 is a top rear perspective view of the air cooled oil cooler assembly according to another embodiment;

FIG. 9 is a top front perspective view of an air cooled oil cooler assembly according to another embodiment;

FIG. 10 is a partial cross-sectional view of the air cooled oil cooler assembly according to another embodiment, showing double-skinned top and bottom front fairings thereof;

FIG. 11 is a schematic partial cross-sectional view of the air cooled oil cooler assembly according to one embodiment, showing a curved profile of the rear top and bottom fairings;

FIG. 12 is a schematic cross-sectional view of the cooler matrix of the air cooled oil cooler assembly according to one embodiment, showing the internal oil passages (in broken lines) thereof; and FIG. 13 is a schematic transverse cross-sectional view of the cooler matrix taken along line F-F in FIG. 12, showing the oil passages and air side fin-passages thereof.

It will be noted that throughout the appended drawings, like features are identified by like reference numerals.

DETAILED DESCRIPTION

FIG. 1 illustrates a turbofan gas turbine engine 10, which is taken as an exemplary application of the described subject matter. The gas turbine engine 10 generally comprises in serial flow communication a fan 12 through which ambient air is propelled, a compressor section 14 for pressurizing the air and a combustor 16 in which the compressed air is mixed with fuel and ignited for generating an annular stream of hot combustion gases, and a turbine section 18 for extracting energy from the combustion gases. The gas turbine engine includes an annular duct 20 defined radially between an outer duct wall 24 and in inner duct wall 26 for directing a fan-driven bypass air stream indicated by arrows 28 to pass therethrough and to be discharged to the atmosphere to create a bypass air thrust to the aircraft engine.

It should be noted that the terms "radially", "axially" and "circumferentially" used throughout the description and the appended claims, are defined with respect to a central axis 13 of the engine 10. The terms "upstream", "downstream", "front", "rear" and "transverse" used throughout the description and the appended claims are defined with respect to the flow direction of the bypass air stream 28.

Referring to FIGS. 1-5 and 10-12, an air cooled oil cooler assembly 30 may be positioned within the annular bypass air duct 20 immediately downstream of struts 32 of an intermediate case of the engine 10. The cooler assembly 30 may be attached to one of the outer and inner duct walls 24, 26. As illustrated in FIG. 1 according to this embodiment, the cooler assembly 30 may be attached to the outer duct wall 24, for example at a lowest circumferential or "6 o'clock" location when the engine is in normal flight attitude. However, in other embodiments the cooler assembly 30 may be located within the annular duct 20 in any selected axial and circumferential location. It is also understood that the cooler may be any suitable cooler for cooling any fluid, and is not limited to the exemplary oil cooler described.

The cooler assembly 30 may include a cooler matrix 34 of any suitable type. The cooler matrix 34 may include oil passages 36 disposed between a header side 38 and a turnaround side 40 of the cooler matrix which are transversely opposed, and being in fluid communication with an oil system 22 of the engine 10. A portion 28*a* of the bypass air stream 28 is directed to pass through air side fin-passages 35 defined between adjacent oil passages 36 in the cooler matrix (see FIG. 13), in order to cool the relatively hot oil passing through the oil passages 36. The cooler matrix 34 according to one embodiment may include opposed front end 41 and rear end 42 extending transversely between the header side 38 and the turnaround side 40 (see FIG. 12), and may include first and second plates 44, 46 extending axially between the front end 41 and rear end 42 and extending transversely between the header side 38 and the turnaround side 40, to form a top and bottom of the cooler matrix 34 when the cooler assembly 30 is so positioned as shown in FIG. 1.

The air cooled oil cooler assembly 30 may further include a fairing assembly (not indicated) having first and second side fairing-housings 48, 50 transversely spaced apart from each other on either side of the matrix 34. Each of the first and second side fairing-housings 48, 50 may have an inner skin 52 and an outer skin 54 joined together at a leading edge 56 and at a trailing edge 58 (with respect to the flow direction of the bypass air stream 28) of the respective first and second side fairing-housings 48, 50. The first and second side fairing-housings 48, 50 each may have any suitable aerodynamic shape and configuration, for example such as the depicted airfoil-like hollow configuration which may have radially opposed first and second ends 60, 62 (top end and bottom end in this embodiment, when the cooler assembly 30 is positioned as shown in FIG. 1). Each of the side fairing-housings 48, 50 may define front, middle and rear portions 49*a*, 49*b*, 49*c* in an axial series from the leading edge 56 to the trailing edge 58. The transversely opposed header side 38 and turnaround side 40 of the cooler matrix 34 may be attached to and/or accommodated in the middle portions 49*b* of the respective first and second side fairing-housings 48, 50.

The cooler assembly 30 may include first and second front fairings 64, 66 (top and bottom front fairings in this embodiment, as positioned in FIG. 1) which are radially spaced apart from each other. The first and second front fairings 64, 66 define respective upstream edges 65*a*, 67*a* and downstream edges 65*b*, 67*b* and extend in the flow direction of the bypass air stream 28 from the upstream edges 65*a*, 67*a* adjacent the leading edges 56 of the respective first and second side fairing-housings 48, 50 and terminate at the downstream edges 65*b*, 67*b* adjacent the cooler matrix 34. The first and second front fairings 64, 66 extend transversely between and are attached to the front portions 49*a* of the respective first and second side fairing-housings 48, 50. Therefore, the first and second front fairings 64, 66 and the front portions 49*a* of the respective first and second side fairing-housings 48, 50, in combination form an inlet for directing the portion 28*a* of the bypass air stream 28 to enter the open space in the cooler matrix and to pass therethrough.

First and second rear fairings 68, 70 which are spaced apart from each other, have respective upstream edges 68*a*, 70*a* and downstream edges 68*b*, 70*b*. Downstream edge 68*b* is disposed on an inner side of the fairing assembly and thus disposed in the duct flow. Downstream edge 70*b* is disposed on an outer side of the fairing assembly adjacent the duct wall and is positioned downstream of the cooler matrix 34. The first and second rear fairings 68, 70 extend from the upstream edges 68*a*, 70*a* adjacent to the cooler matrix 34 in a downstream direction and terminate at the downstream edges 68*b*, 70*b*. The first and second rear fairings 68, 70 extend transversely between and are attached to the rear portions 49*c* of the respective first and second side fairing-housings 48, 50. Therefore, the rear portions 49*c* of the respective first and second side fairing-housings 48, 50 and the first and second rear fairings 68, 70 in combination define an outlet (not indicated) for directing the portion 28*a* of the bypass air stream 28 which has passed through and has been discharged from the cooler matrix 34.

The first front fairing 64 and the first rear fairing 68 may be attached to the first ends 60 (top ends) of the airfoil-like hollow configuration of the respective first and second side fairing-housings 48, 50 and may be substantially flush with the first plate 44 (top plate) of the cooler matrix 34. The first front and first rear fairings 64, 68 may be shaped in an aerodynamically curved profile such that outer surfaces of the first front and first rear fairings 64, 68 in combination with the first plate 44 of the cooler matrix 34 positioned therebetween may define an air flow guiding surface having a substantially aerodynamic profile and being free of a substantial obstacle to the bypass air stream 28 passing by the cooler assembly 30. Optionally, in a similar configuration, outer surfaces of the second front and second rear fairings 66, 70 with the second plate 46 (bottom plate) of the cooler matrix 34 in combination may define an airflow guiding surface having an aerodynamic profile and being free of a substantial obstacle to the cooling air stream 28 passing thereby, which will not be redundantly described herein.

According to one embodiment, the second ends 62 of the respective first and second side fairing-housings 48, 50 may be positioned radially adjacent the outer duct wall 24 to which the cooler assembly 30 is attached as shown in FIG. 1, and the first ends 60 of the respective first and second side fairing-housings 48, 50 may be positioned radially distal from the outer duct wall 24. It should be noted that the cooler assembly 30 may have a radial dimension between the first and second ends 60, 62, smaller than a radial dimension of the annulus defined between the outer and inner duct walls 24, 26. Therefore, in contrast to the air flow guiding surface defined by the second front and second rear fairings 66, 70 with the second plate 46 of the cooler matrix 34 which is positioned very close to the outer duct wall 24, the air flow guiding surface defined by the first front and first rear fairings 64, 68 with the first plate 44 of the cooler matrix 34 is exposed to a main flow of the bypass air stream 28.

Optionally, the outer skin 54 of the respective first and second side fairing-housings 48, 50 may extend from the first end 60 to the second end 62 at a chamfered angle C (see FIG. 5) with respect to a line 72 which is perpendicular to the first plate 44 (or an outer surface of the first plate 44) of the cooler matrix 34, for better accommodating the header and turnaround sides 38, 40 of the cooler matrix 34 while minimizing the space requirement that creates blockage in the annular duct 20. The chamfered angle C may vary in different axial locations, for example, angle C may increase axially from the leading edge 56 toward the middle portion 49b of the respective first and second side fairing-housings 48, 50 and then decrease toward the trailing edge 58. Therefore, the chamfered trailing edge 58 and an inner surface of the first rear fairing 68 may define an obtuse angle A therebetween and the trailing edge 58 and an inner surface of the second rear fairing 70 may define an acute angle B therebetween (see FIG. 3). The inner surface of the first and second rear fairings 68, 70 face toward each other to direct the portion 28a of the bypass air stream 28.

Optionally, the transverse dimension of the first side fairing-housing 48 (the middle portion 49b thereof in particular) may be greater than the transverse dimension of the second side fairing-housing 50 (the middle portion 49b thereof in particular) in order to accommodate a valve 74 (see FIG. 4) attached to the header side 38 of the cooler matrix 34 for controlling the oil circulation through the cooler matrix 34.

The downstream edges 68b, 70b of the respective first and second rear fairings 68, 70, and optionally in combination with the chamfered trailing edges 58 of the respective first and second side fairing-housings 48, 50, may define a trapezoidal outlet opening of the cooler assembly 30 (see FIG. 3). Such a shape may reduce the axial length of the rear portion 49c and/or reduce the outer skin 54 external diffusion angle E (see FIG. 4) of the respective first and second side fairing-housings 48, 50 for a given outlet opening requirement sizing to meet the cooling flow requirement. The external diffusion angle E is defined with respect to the axial direction and is also referred to as a rear boat-tail angle.

The inlet defined by the combination of the first and second front fairings 64, 66 and the front portions 49a of the respective first and second side fairing-housings 48, 50, may have a rectangular inlet opening as shown in FIG. 2, or may alternatively also have a trapezoidal inlet opening.

Optionally, the downstream edge 68b of the first rear fairing 68 may define a concave curvature (see FIG. 3). Alternately, the downstream edge 68b of the first rear fairing 68 may be positioned at an axial location upstream of the trailing edges 58 (see FIG. 9) such that the axial dimension of the first rear fairing 68 is shorter than the axial dimension of the rear portions 49c of the respective first and second side fairing-housings 48, 50.

In use, for a given cooler outlet sized to meet the cooling flow requirement, a trapezoidal outlet shape may provide relief on an external average diffusion angle D (see FIG. 11) of the first and second rear fairing 68, 70, which may assist in improving the dynamic characteristics of the cooler assembly. In this application, a trapezoid is defined as a quadrilateral having two transversely-extending sides of different lengths, while the two radially-extending sides converge. In the described embodiments, the shorter transverse side is the inner side which is disposed in the bypass flow while the longer side is outer side disposed adjacent the bypass wall.

As shown in FIG. 10, the first and second front fairings 64, 66 according to one embodiment may be configured with a double-skinned configuration having respective outer first and second front skins 64a, 66a and respective inner first and second front skins 64b, 66b. The outer first and second front skins 64a, 66a and the inner first and second front skins 64b, 66b may be joined at the respective upstream edges 65a, 67a and downstream edges 65b, 67b and may have their own aerodynamic curvatures.

Optionally, the second rear fairing 70 which is positioned closest to the outer duct wall 24 of the annular duct 20 may be omitted in order to reduce the weight of the cooler assembly 30, as shown in FIG. 8. The second rear fairing 70 may also be scalloped, as shown in FIG. 7.

As illustrated in FIGS. 6 and 7, the cooler assembly 30 according to further embodiments may include front and/or rear stiffening ribs 76, 78 with or without scalloping, secured to and extending between the respective first and second front fairings 64, 66 and/or between the first and second rear fairings 68, 70, in order to improve durability for static and dynamic stresses and to reduce weight.

Optionally, mounting devices 80 may be attached to the respective first and second side fairing-housings 48, 50, for example at the middle portion 49b thereof (see FIGS. 2, 3 and 9). The mounting device 80 may be positioned outside and/or inside the respective first and second side fairing-housings 48, 50.

The above description is meant to be exemplary only, and one skilled in the art will recognize that changes may be made to the embodiments described without departing from the scope of the described subject matter. For example, the oil assembly may be disposed in an annular bypass duct of a gas turbine engine in a radial, axial and/or circumferential position different from that illustrated in FIG. 1. Any suitable gas turbine configuration may be employed. The cooler matrix need not be restricted to any particular shape, type or configuration. Although the described embodiments discuss numerous fairings cooperating together, it is understood the various elements could be provided as an integrated piece or assembly. The subject matter disclosed herein is applicable for cooling any suitable fluids. Other modifications which fall within the scope of the described subject matter will be apparent to those skilled in the art, in light of a review of this disclosure, and such modifications are intended to fall within the appended claims.

The invention claimed is:

1. A cooler assembly for a gas turbine engine, the cooler assembly disposed in a duct of the gas turbine engine for cooling by an air stream through the duct, the cooler assembly comprising:
a cooler matrix in fluid communication with an engine fluid system to be cooled and a fairing assembly disposed to at least partially house the cooler matrix, the fairing assembly having a first side fairing-housing and a second side fairing-housing, each of the first side fairing-housing and the second side fairing-housing having a respective leading edge and a respective trailing edge, the respective leading edges being indirectly connected within the fairing assembly and the respective trailing edges being indirectly connected within the fairing assembly, the respective leading edges partially defining a cooler inlet and the respective trailing edges partially defining a cooler outlet, the cooler outlet including an inner side and an outer side respectively interconnecting the respective trailing edges of the first side fairing-housing and the second side fairing-housing, the respective trailing edges of the first side fairing-housing and the second side fairing-housing being angled transversely toward each other such that the inner side of the cooler outlet is shorter than the outer side of the cooler outlet.

2. The cooler assembly as defined in claim 1, wherein the inner side of the cooler outlet is disposed in the air stream within the duct and the outer side of the cooler outlet is adjacent a wall of the duct.

3. The cooler assembly as defined in claim 2, wherein a rear fairing provides the indirect connection between the respective trailing edges of the first side fairing-housing and the second side fairing-housing in the fairing assembly, and wherein the rear fairing comprises a concave profile.

4. The cooler assembly as defined in claim 1, wherein the first side fairing-housing has a maximum transverse dimension greater than a maximum transverse dimension of the second side fairing-housing, the first side fairing-housing accommodating a valve attached to a sides of the cooler matrix.

5. The cooler assembly as defined in claim 1, wherein the cooler inlet has a trapezoidal shape.

6. A gas turbine engine having a duct with an air stream passing therethrough, the gas turbine engine comprising:
a cooler assembly disposed in the duct and attached to a duct wall, the cooler assembly including a cooler matrix in fluid communication with fluid system of the gas turbine engine, first and second side fairing-housings circumferentially spaced apart from each other, first and second front fairings radially spaced apart from each other and extending in a downstream direction toward the cooler matrix and extending transversely between respective front portions of the first and second side fairing-housings to form an inlet for directing a portion of the air stream to enter and pass through the cooler matrix, a first rear fairing positioned downstream of the cooler matrix and extending transversely between respective rear portions of the first and second side fairing-housings, the respective rear portions of the first and second side fairing-housings and an inner surface of the first rear fairing directing the portion of the air stream which has passed through and which has been discharged from the cooler matrix,
wherein respective trailing edges of each of the first side fairing-housing and the second side fairing-housing each define an obtuse angle with respect to the inner surface of the first rear fearing.

7. The gas turbine engine as defined in claim 6, wherein the cooler assembly further comprises a second rear fairing having an inner surface spaced apart from and facing toward the inner surface of the first rear fairing, the second rear fairing extending transversely between the respective rear portions of the first and second side fairing-housings, the respective trailing edges of each of the first side fairing-housing and the second side fairing-housing each defining an acute angle with respect to the inner surface of the second rear fairing.

8. The gas turbine engine as defined in claim 6, wherein the cooler assembly further comprises a second rear fairing extending transversely between the respective rear portions of the first and second side fairing-housings, the respective rear portions of the first and second side fairing-housings, in combination, defining an outlet for directing the portion of the air stream which has passed through and which has been discharged from the cooler matrix.

9. The gas turbine engine as defined in claim 6, wherein respective trailing edges of the first side fairing-housing and the second side fairing-housings and respective downstream edges of the first rear fairing and the second rear fairing, in combination, define an outlet, the downstream edge of the first rear fairing being shorter than the downstream edge of the second rear fairing.

10. The gas turbine engine as defined in claim 6, wherein the first rear fairing extends in the downstream direction and terminates to form a downstream edge thereof, the downstream edge of the first rear fairing being positioned upstream of the trailing edges of the first and second side fairing-housings.

11. The gas turbine engine as defined in claim 6, wherein the first rear fairing extends in the downstream direction and terminates to form a downstream edge thereof, the downstream edge of the first rear fairing defining a concave profile.

12. The gas turbine engine as defined in claim 6, wherein the first side fairing-housing has a maximum transverse dimension greater than a maximum transverse dimension of the second side fairing-housing, the first side fairing-housing accommodating a header side of the cooler matrix and a valve, and the second side fairing-housing accommodating a turnaround side of the cooler matrix.

13. The gas turbine engine as defined in claim 6, wherein respective outer skins of each of the first side fairing-housing and the second side fairing-housings extend outwardly at a chamfered angle with respect to a line perpendicular to an outer surface of the cooler matrix, the chamfered angle varying axially from a cooler leading edge to a cooler trailing edge.

* * * * *